United States Patent [19]
Cheng

[11] Patent Number: 5,873,389
[45] Date of Patent: Feb. 23, 1999

[54] STRUCTURE OF FAUCET

[76] Inventor: Tsan-Hsiung Cheng, No. 1051 Lung Tien, Lung Pen Tsun, Kuan Tien Hsiang, Tainan County, Taiwan

[21] Appl. No.: 992,846

[22] Filed: Dec. 18, 1997

[51] Int. Cl.$^6$ ........................................... F16K 3/22
[52] U.S. Cl. ................ 137/801; 251/315.06; 251/315.12
[58] Field of Search ........................ 137/801; 251/315.06, 251/315.12

[56] References Cited

U.S. PATENT DOCUMENTS

| | | | |
|---|---|---|---|
| 1,677,242 | 7/1928 | Larrigan | 251/315.06 X |
| 2,117,456 | 5/1938 | Schellin | 251/315.06 |
| 3,700,211 | 10/1972 | Manoogian | 251/315.06 X |
| 4,565,218 | 1/1986 | Yang | 251/315.06 X |

*Primary Examiner*—Gerald A. Michalsky
*Attorney, Agent, or Firm*—Varndell Legal Group

[57] ABSTRACT

A faucet including a faucet body defining a ball socket between a water intake port and a water output port, a ball valve mounted in the ball socket and retained between two rigid gasket members, a packing nut fastened to the ball socket to hold down the rigid gasket members and the ball valve, and a handle coupled to the ball valve and moved vertically to turn the ball valve between a first position where the water passage between the water intake port and the water output port is stopped by the ball valve, and a second position where the ball valve imparts a water passage in communication between the water intake port and the water output port.

1 Claim, 4 Drawing Sheets

STRUCTURE OF FAUCET

BACKGROUND OF THE INVENTION

The present invention relates to faucets, and more particularly to such a faucet which uses a ball valve turned in a ball socket to change the position of a water guide way thereon, so as to close/open the water passage.

FIG. 1 shows a faucet according to the prior art. This structure of faucet comprises stem, a handle fixedly connected to the stem at the top, and a rubber gasket fixedly fastened to the stem at the bottom. The handle is turned to move the stem up and down, causing the rubber gasket to close/open the valve seat defined inside the faucet. The drawback of this structure of faucet is that the rubber gasket wears quickly with use. FIG. 2 shows another structure of faucet according to the prior art. This structure of faucet uses a high-precision ceramic valve to control the water passage. This structure of faucet is complicated and expensive. Further, the maintenance work of this structure of faucet is not easy.

SUMMARY OF THE INVENTION

The present invention provides an improved faucet which is comprised of a faucet body defining a ball socket between a water intake port and a water output port, a rigid first gasket member and a rigid second gasket member mounted within the ball socket, a ball valve mounted in the ball socket between the fist gasket member and the second gasket member, a packing nut fastened to the ball socket to hold down the gasket members and the ball valve, a handle having a downward stem connected to the ball valve by a screw, and a cap covered on the handle over the screw. The ball valve has a water guide way at a bottom side. The ball valve is turned in the ball socket to move its water guide way between the water intake port and the water output port, so as to control the flow rate of water. The cap has a red color area or a blue color area for hot water/cold water indications. The invention achieves the following advantages:

1. When the hands are not free or a disabled person wishes to operate the faucet, the user can conveniently operate the handle with the elbow or the wrist to control the ball valve in opening/closing the water passage.
2. If the ball valve is not accurately moved to the close position when to close the faucet, it can be checked visually and immediately corrected, therefore the user will not forget to close the faucet even when water supply is stopped.
3. Because the close/open of the faucet is controlled by turning a ball valve in a ball socket between two positions, the rubber gasket wearing problem in conventional faucets is eliminated.

Each part of the faucet is easy to be made; moreover, there are not any consumptive parts.

DETAILED DESCRIPTION OF THE PREFERRED EMBODIMENT

Figure 1:
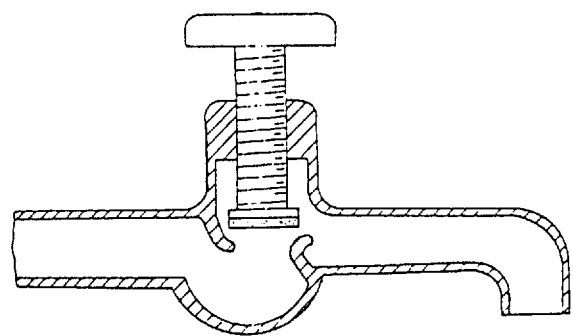
FIG. 1 is a sectional view of a faucet according to the prior art.
Figure 2:
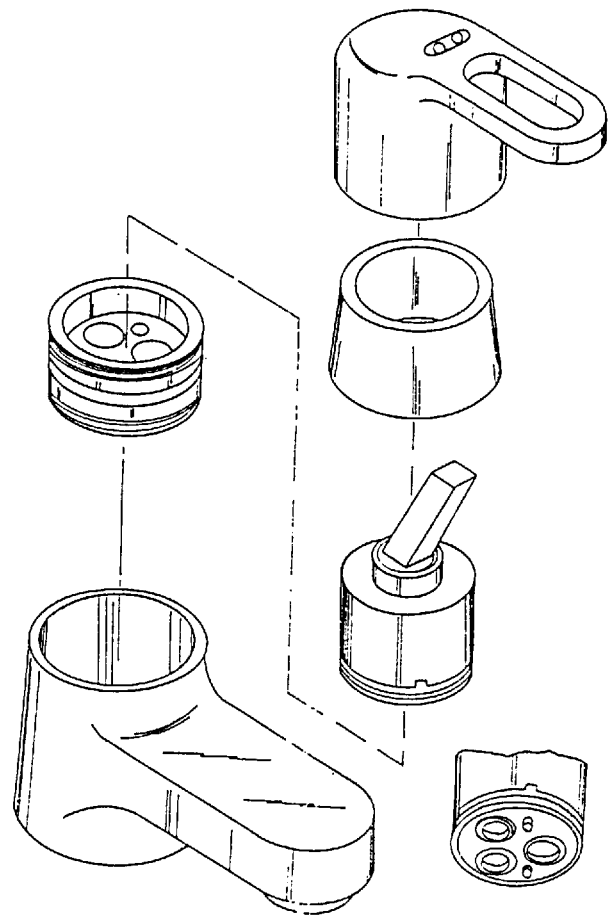
FIG. 2 is an exploded view of another structure of ceramic faucet according to the prior art.
Figures 3, 4:
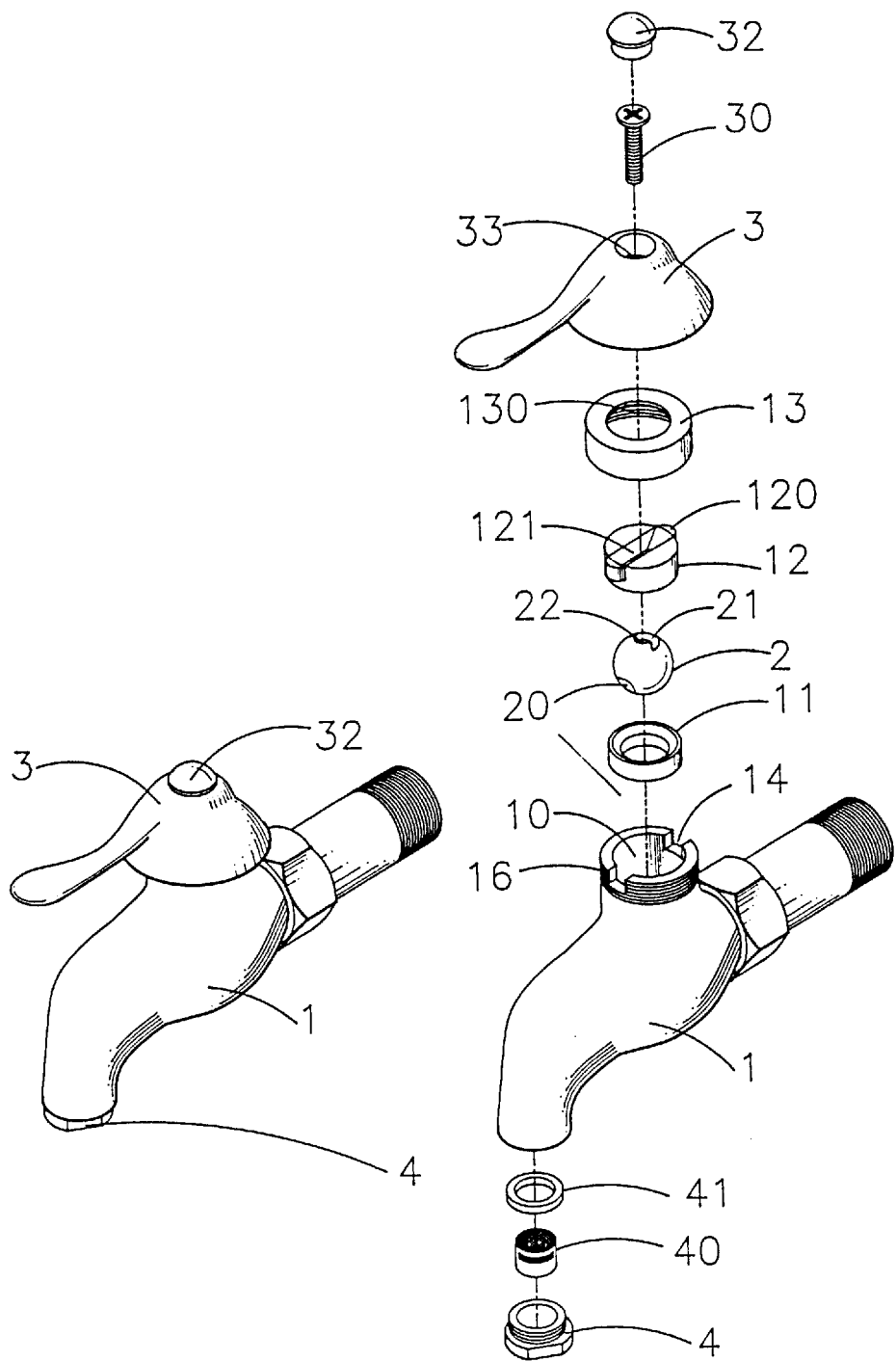
FIG. 3 is an elevational view of a faucet according to the present invention.
FIG. 4 is an exploded view of the faucet shown in FIG. 3.

Referring to Figures from 3 to 6, a faucet in accordance with the present invention is generally comprised of a faucet body 1 shaped like a curved tube. The faucet body 1 comprises a ball socket 10 at the top, which receives a ball valve 2, a water intake port 15 at a bottom side of the ball socket 10, and a water output port 17 at a front side of the ball socket 10. A first gasket member 11 is mounted in the water intake port 15 to support the ball valve 2. The first gasket member 11 is made from rigid engineering plastic or teflon, having an annular shape. When the ball valve 2 is supported on the first gasket member 11, the water intake port 15 is closed to stop water from passing to the inside of the ball socket 10. The ball valve 2 comprises a water guide way 20 at a bottom side, a recessed seat 21 at a top side, and a screw hole 22 in the recessed seat 21. A second gasket member 12 is mounted within the ball socket 10 and covered on the ball valve 2 at the top. The second gasket member 12 comprises two locating flanges 120 raised from the periphery at two opposite sides and respectively forced into engagement with respective notches 14 at the top of the faucet body 1, and an elongated slot 121 on the middle. A packing nut 13 is fastened to the faucet body 1 at the top to hold down the second gasket member 12. The inner thread 130 of the packing nut 13 is threaded onto an outer thread 16 around the faucet body 1 at the top. A handle 3 is provided having a downward stem 31 at one end, and a countersunk hole 33 pierced through the longitudinal central axis of the downward stem 31. The downward stem 31 of the handle 3 is inserted through the packing nut 13 and the elongated slot 121 of the second gasket member 12, and then engaged into the recessed seat 21 of the ball valve 2. A screw 30 is mounted in the countersunk hole 33 of the handle 3 and threaded into the screw hole 22 of the ball valve 2 to fix the handle 3 and the ball valve 2 together. A cap 32 is fastened to the countersunk hole 33 of the handle 3 and covered on the screw 30. The cap 32 has a red color area or a blue color area at its top for hot water or cold water indications respectively. A lock nut 4 is fastened to the spout of the water output port 17 to hold a rubber seal ring 41 and a water filter element 40.

Figure 5:
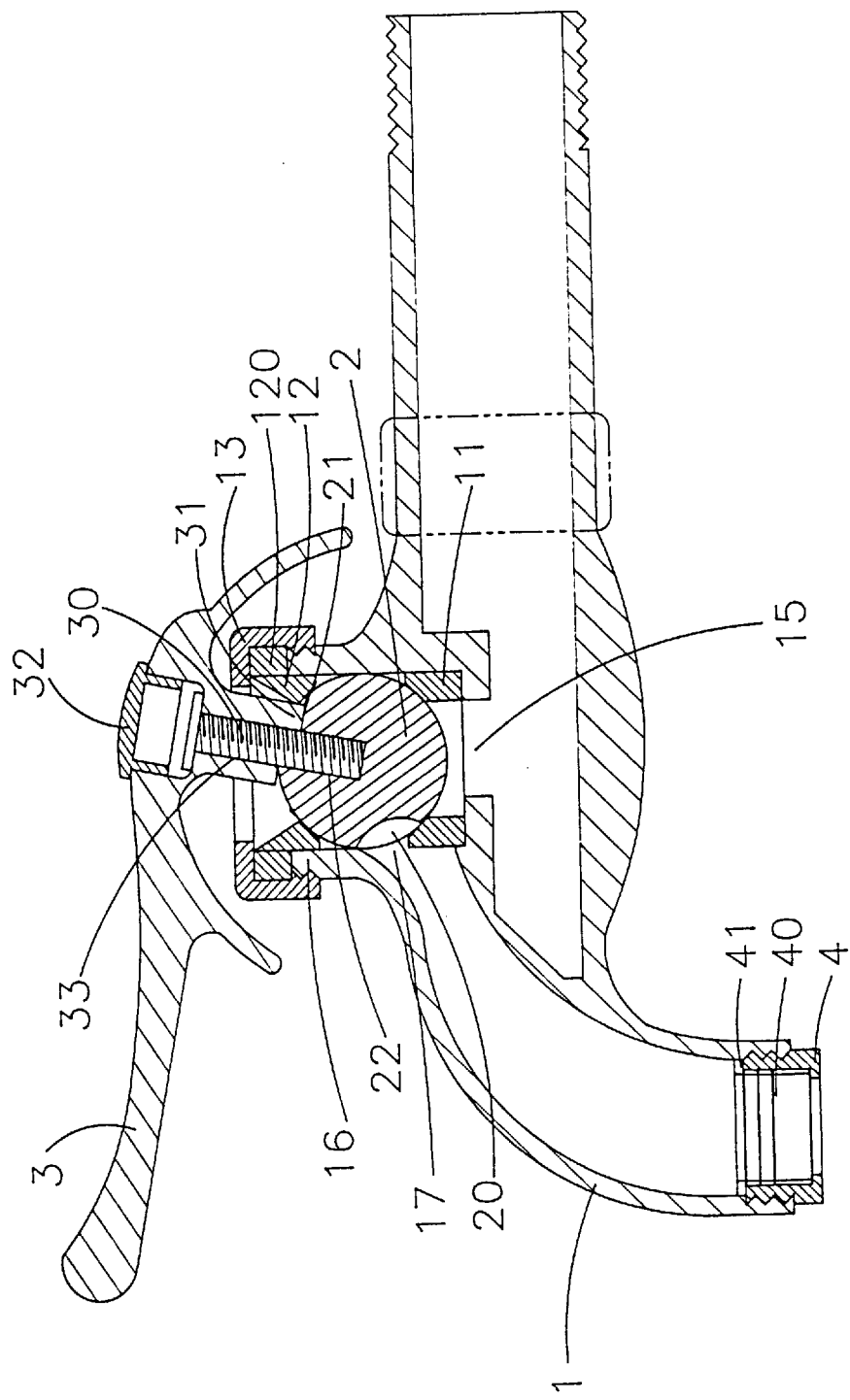
FIG. 5 is a sectional view in an enlarged scale of the present invention, showing the faucet closed.
Figure 6:
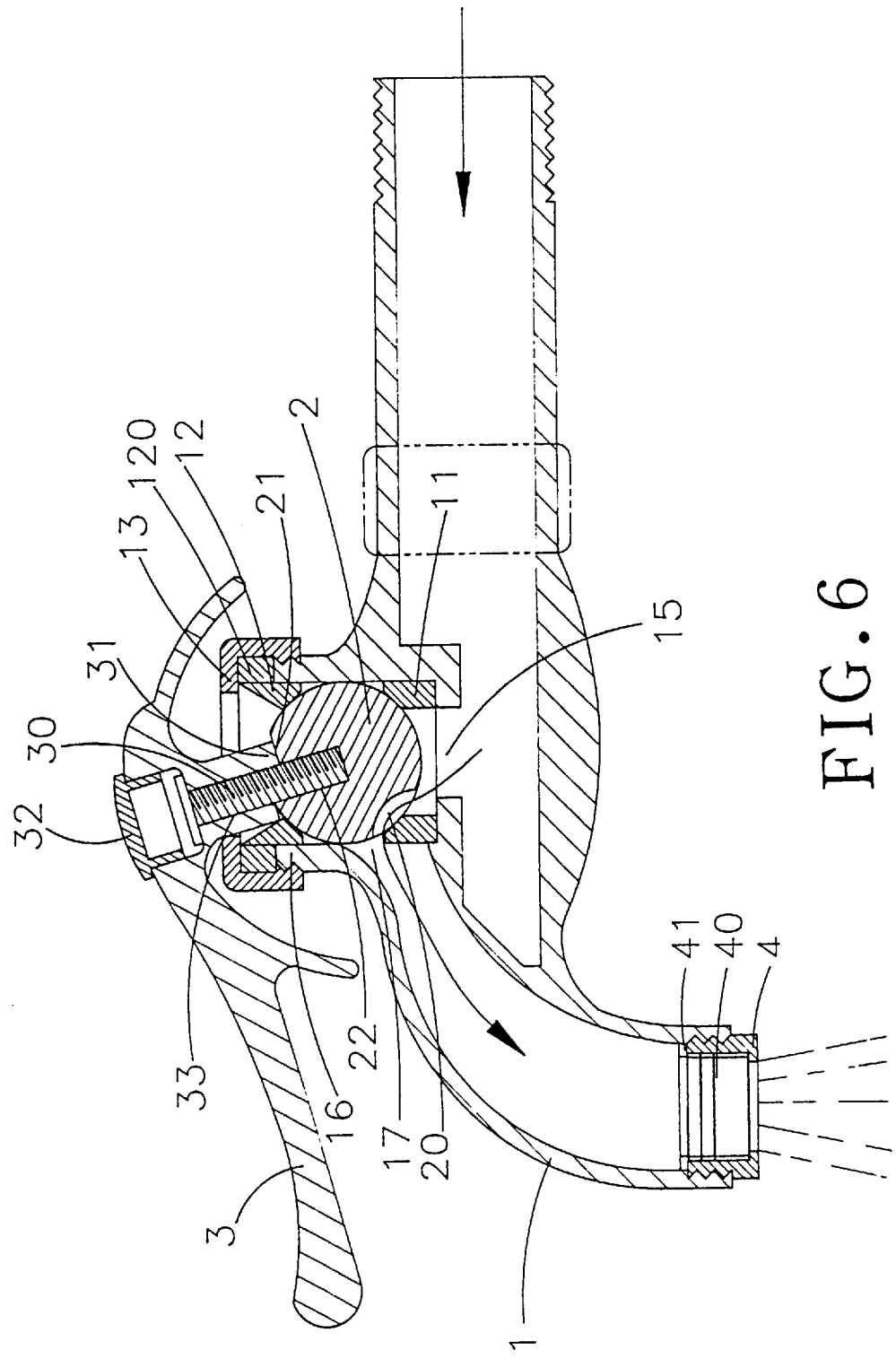
FIG. 6 is another sectional view of the present invention, showing the faucet opened.

FIG. 5 shows the faucet set in the close position. FIG. 6 shows the faucet set in the open position. The ball valve 2 is forced downwards against the first gasket member 11 by the packing nut 13 and the second gasket member 12, thereby causing the ball valve 2 to close the water passage between the water intake port 15 and the ball socket 10. Because the locating flanges 120 of the second gasket member 12 are respectively engaged into the notches 14 at the top of the faucet body 1, the handle 3 is prohibited from a rotary motion relative to the second gasket member 12, and can only be turned up and down. When the handle 3 is lifted to the position shown in FIG. 5, the water guide way 20 of the ball valve 2 is moved away from the water intake port 15 and faces the water output port 17, therefore the water passage between the water intake port 15 and the water output port 17 is stopped. When the handle 3 is turned downwards to the position shown in FIG. 6, the water guide way 20 of the ball valve 2 is disposed in communication between the water intake port 15 and the water output port 17, therefore water is allowed to pass from the water intake port 15 through the water guide way 20 to the water output port 17.

While only one embodiment of the present invention has been shown and described, it will be understood that various modifications and changes could be made thereunto without departing from the spirit and scope of the invention.

What I claim is:

1. A faucet comprising:

a faucet body defining a water intake port at one end, a water output port at an opposite end, and a ball socket, said ball socket imparting a water passage between said water intake port and said water output port;

a rigid first gasket member mounted within said ball socket at a bottom side;

a rigid second gasket member mounted within said ball socket at a top side and prohibited from a rotary motion relative to said ball socket, said second gasket member comprising a plurality of locating flanges raised from the periphery and respectively forced into engagement with the locating notches on said faucet body, and an elongated slot on the middle;

a ball valve mounted in said ball socket and retained between said first gasket member and said second gasket member and turned to close/open the water passage between said water intake port and said water output port, said ball valve comprising a water guide way at a bottom side thereof, a recessed seat at a top side thereof, and a screw hole in said recessed seat;

a packing nut fastened to said ball socket by a screw joint to hold down said second gasket member, said ball valve and said first gasket member in said ball socket; and a handle adapted to turn said ball valve between a first position where the water guide way of said ball valve is moved away from said water intake port and the water passage between said water intake port and said water output port is stopped by said ball valve, and a second position where the water guide way of said ball valve is disposed in communication between said water intake port and said water output port for permitting water to pass from said water intake port to said water output port, said handle comprising a downward stem at one end inserted through said packing nut and the elongated slot of said second gasket member and then engaged into the recessed seat of said ball valve, and a countersunk hole pierced through the longitudinal central axis of said downward stem and fixedly connected to the screw hole of said ball valve by a screw.

* * * * *